(12) United States Patent
Evanini

(10) Patent No.: US 9,489,864 B2
(45) Date of Patent: *Nov. 8, 2016

(54) SYSTEMS AND METHODS FOR AN AUTOMATED PRONUNCIATION ASSESSMENT SYSTEM FOR SIMILAR VOWEL PAIRS

(71) Applicant: Educational Testing Service, Princeton, NJ (US)

(72) Inventor: Keelan Evanini, Pennington, NJ (US)

(73) Assignee: Educational Testing Service, Princeton, NJ (US)

(*) Notice: Subject to any disclaimer, the term of this patent is extended or adjusted under 35 U.S.C. 154(b) by 227 days.

This patent is subject to a terminal disclaimer.

(21) Appl. No.: 14/148,772

(22) Filed: Jan. 7, 2014

(65) Prior Publication Data
US 2014/0195239 A1 Jul. 10, 2014

Related U.S. Application Data

(60) Provisional application No. 61/749,447, filed on Jan. 7, 2013.

(51) Int. Cl.
*G10L 21/00* (2013.01)
*G10L 15/04* (2013.01)
(Continued)

(52) U.S. Cl.
CPC ............... *G09B 19/04* (2013.01); *G09B 5/06* (2013.01); *G10L 15/187* (2013.01); *G10L 25/60* (2013.01); *G10L 15/04* (2013.01); *G10L 25/15* (2013.01)

(58) Field of Classification Search
CPC ....... G10L 21/00; G10L 15/04; G10L 15/20; G10L 15/28; G09B 19/04

USPC ................. 704/209, 251, 254, 236
See application file for complete search history.

(56) References Cited

U.S. PATENT DOCUMENTS

| 5,799,276 A | * | 8/1998 | Komissarchik | ......... G10L 15/04 704/207 |
| 2005/0119889 A1 | * | 6/2005 | Yamazaki | ............... G10L 13/07 704/259 |

(Continued)

OTHER PUBLICATIONS

Neel, Amy T. "Vowel space characteristics and vowel identification accuracy." Journal of Speech, Language, and Hearing Research 51.3 (2008): 574-585.*

(Continued)

*Primary Examiner* — Pierre-Louis Desir
*Assistant Examiner* — Seong Ah A Shin
(74) *Attorney, Agent, or Firm* — Jones Day

(57) ABSTRACT

Computer-implemented systems and methods are provided for assessing non-native speech proficiency. a non-native speech sample is processed to identify a plurality of vowel sound boundaries in the non-native speech sample. Portions of the non-native speech sample are analyzed within the vowel sound boundaries to extract vowel characteristics associated with a first vowel sound and a second vowel sound represented in the non-native speech sample. The vowel characteristics are processed to identify a first vowel pronunciation metric for the first vowel sound and a second vowel pronunciation metric for the second vowel sound, and the first vowel pronunciation metric and the second vowel pronunciation metric are processed to determine whether the non-native speech sample exhibits a distinction in pronunciation of the first vowel sound and the second vowel sound.

15 Claims, 8 Drawing Sheets

(51) Int. Cl.
  G10L 15/20    (2006.01)
  G10L 15/28    (2013.01)
  G09B 19/04    (2006.01)
  G10L 15/187   (2013.01)
  G10L 25/60    (2013.01)
  G09B 5/06     (2006.01)
  G10L 25/15    (2013.01)

(56) References Cited

U.S. PATENT DOCUMENTS

| | | | | |
|---|---|---|---|---|
| 2006/0004567 | A1* | 1/2006 | Russell | G09B 5/06 |
| | | | | 704/209 |
| 2012/0016672 | A1* | 1/2012 | Chen | G10L 25/60 |
| | | | | 704/236 |
| 2012/0078625 | A1* | 3/2012 | Stokes | G10L 15/02 |
| | | | | 704/233 |

OTHER PUBLICATIONS

Bradlow et al., "Intelligibility of normal speech I: Global and fine-grained acoustic-phonetic talker characteristics." Speech communication 20.3 (1996): 255-272.*
Boersma, Paul, Weenink, David; Praat: Doing Phonetics by Computer; http://www/praat.org; 2012.
Cmudict: The CMU Pronouncing Dictionary; http://www.speech.cs.cmu.edu/cgi-bin/cmudict; 2008.
Evanini, Keelan, Isard, Stephen, Liberman, Mark; Automatic Formant Extraction for Sociolinguistic Analysis of Large Corpora; Proceedings of Interspeech—2009; pp. 1655-1658; 2009.
Flege, James, Mackay, Ian, Meador, Diane; Native Italian Speakers' Perception and Production of English Vowels; Journal of the Acoustical Society of America, 106(5); pp. 2973-2987; 1999.
Flege, James, Bohn, Ocke-Schwen, Jang, Sunyoung; Effects of Experience on Non-Native Speakers' Production and Perception of English Vowels; Journal of Phonetics, 25; pp. 437-470; 1997.
Flege, James, Yeni-Komshian, Grace, Liu, Serena; Age Constraints on Second-Language Acquisition; Journal of Memory and Language, 41; pp. 78-104; 1999.
Huang, Becky; Age-Related Effects on the Acquisition of Second Language Phonology and Grammar; PhD Dissertation, University of California, Los Angeles; 2009.
Labov, William, Ash, Sharon, Boberg, Charles; The Atlas of North American English: Phonetics, Phonology and Sound Change; Mouton de Gruyter: Berlin; [Undated].
Munro, Murray, Flege, James, Mackay, Ian; The Effects of Age of Second Language Learning on the Production of English Vowels; Applied Psycholinguistics, 17; pp. 313-334; 1996.
Weinberger, Steven; Speech Accent Archive; http://accent.gmu/edu; 2012.
Wu, Chen-Huei; The Evaluation of Second Language Fluency and Foreign Accent; PhD Dissertation, University of Illinois at Urbana-Champaign; 2011.
Yuan, Jiahong, Liberman, Mark; Speaker Identification on the SCOTUS Corpus; Proceedings of Acoustics 2008; 2008.
U.S. Appl. No. 13/182,770, Systems and Methods for Assessment of Non-Native Speech Using Vowel Space Characteristics, filed Jul. 14, 2011.

* cited by examiner

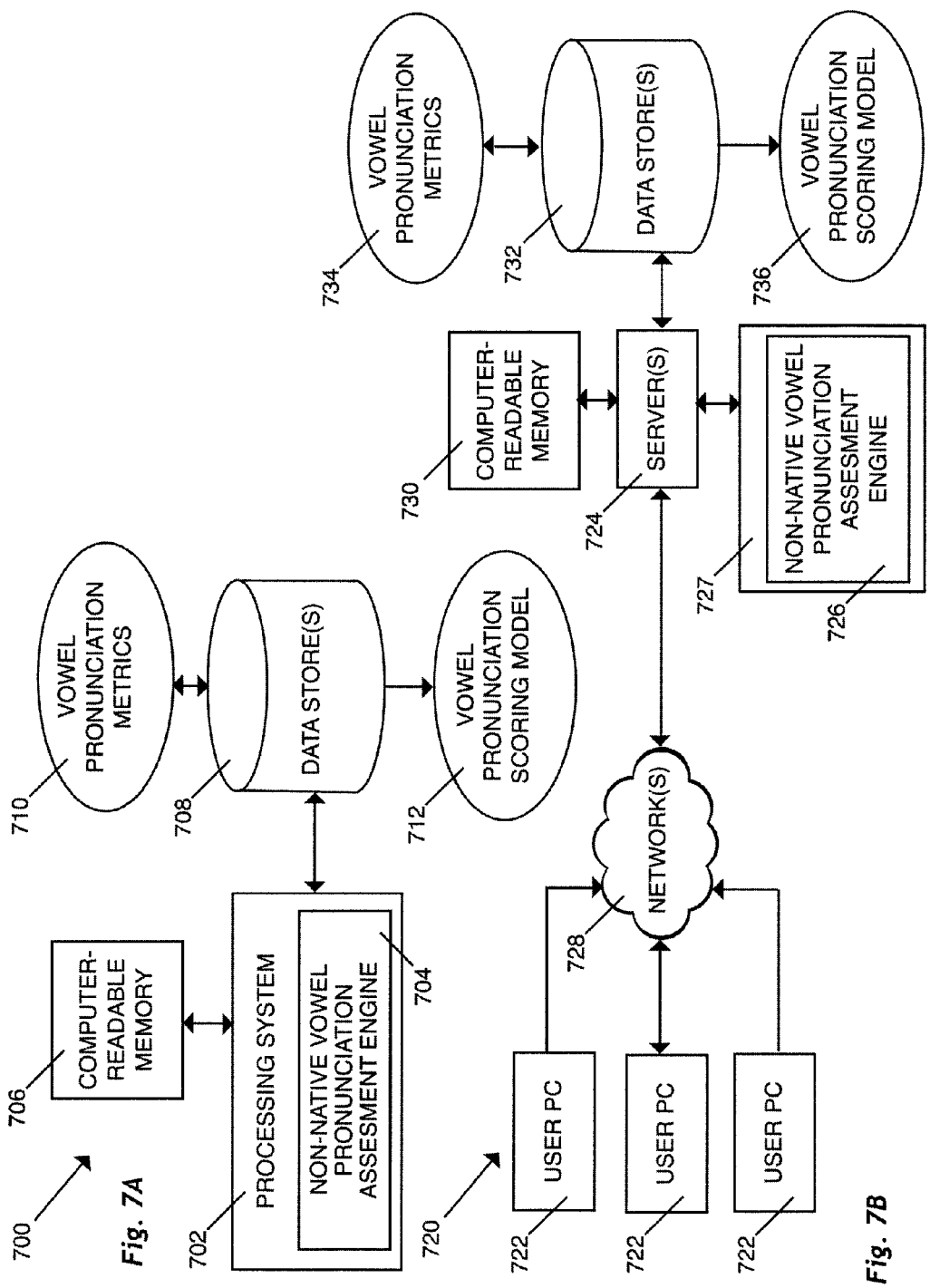

SYSTEMS AND METHODS FOR AN AUTOMATED PRONUNCIATION ASSESSMENT SYSTEM FOR SIMILAR VOWEL PAIRS

This application claims priority to U.S. Provisional Application No. 61/749,447 filed on Jan. 7, 2013, entitled "Production of English Vowels by Speakers of Mandarin Chinese with Prolonged Exposure to English," the entirety of which is herein incorporated by reference.

FIELD

The technology described herein relates generally to spoken language proficiency testing and more specifically to spoken language pronunciation proficiency testing using vowel pronunciation characteristics.

BACKGROUND

It is often desirable to measure a person's ability to vocally communicate in a particular language. Such assessments may measure a person's ability to communicate in the native language of the person, or the assessments may measure the person's ability to speak a foreign language. Oftentimes, speech proficiency examinations are scored by one or more human scorers. For example, a person (examinee) may read a provided text aloud, and the one or more human scorers, who listen to the person's reading live or via a recording, provide a score representing a perceived ability of the examinee to communicate in the language being tested. Human speech scoring can be time consuming, costly, and otherwise inefficient.

SUMMARY

In accordance with the teachings herein, computer-implemented systems and methods are provided for assessing non-native speech proficiency. A non-native speech sample is processed to identify a plurality of vowel sound boundaries in the non-native speech sample. Portions of the non-native speech sample are analyzed within the vowel sound boundaries to extract vowel characteristics associated with a first vowel sound and a second vowel sound represented in the non-native speech sample. The vowel characteristics are processed to identify a first vowel pronunciation metric for the first vowel sound and a second vowel pronunciation metric for the second vowel sound, and the first vowel pronunciation metric and the second vowel pronunciation metric are processed to determine whether the non-native speech sample exhibits a distinction in pronunciation of the first vowel sound and the second vowel sound.

BRIEF DESCRIPTION OF THE DRAWINGS

FIGS. 7A, 7B, and 7C depict example systems for use in implementing a non-native vowel pronunciation assessment engine.

DETAILED DESCRIPTION

Figure 1:
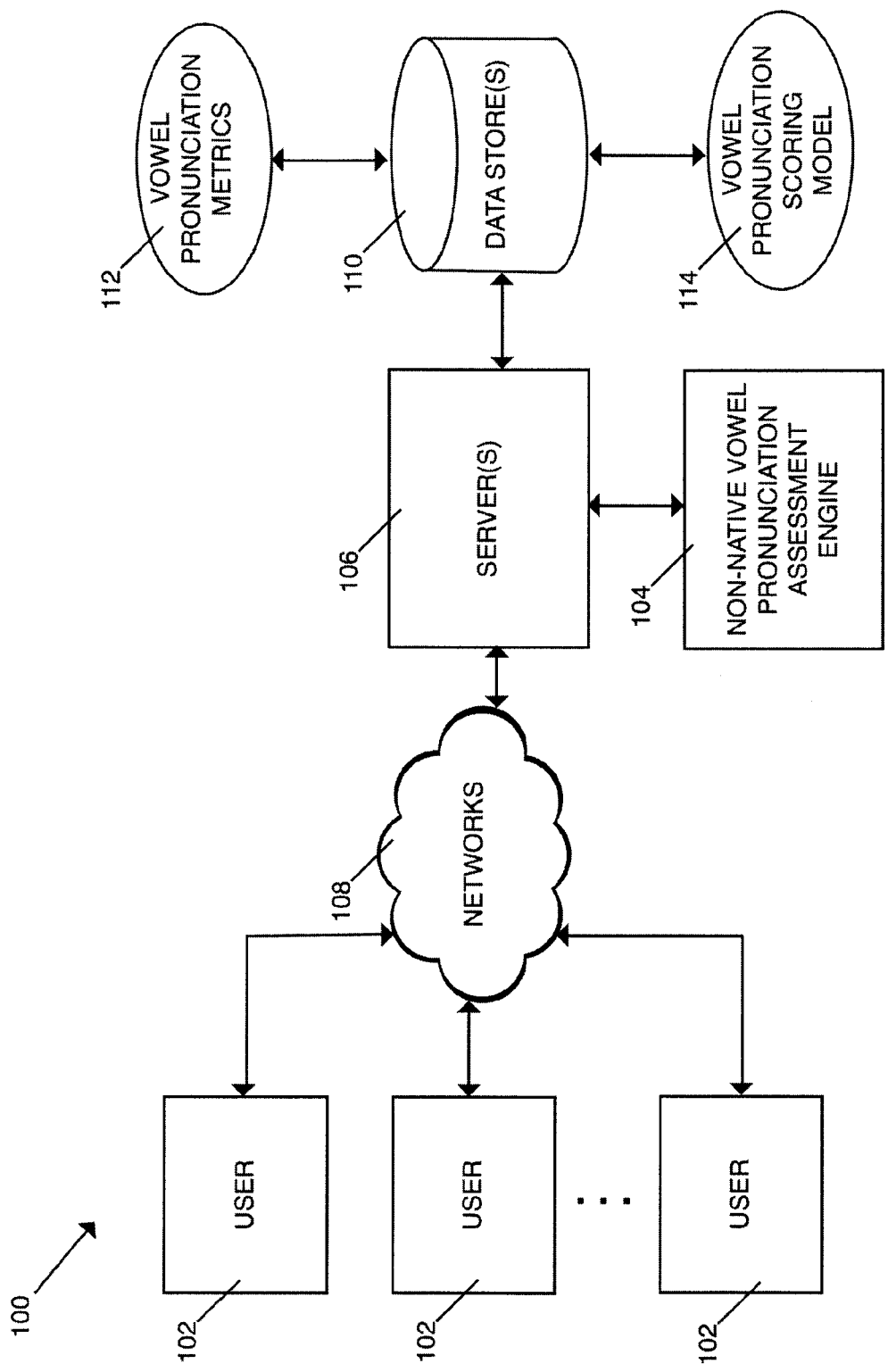
FIG. 1 depicts a computer-implemented environment wherein users can interact with a non-native vowel pronunciation assessment engine hosted on one or more servers through a network.

FIG. 1 depicts a computer-implemented system 100 wherein users 102 can interact with a non-native vowel pronunciation assessment engine 104 hosted on one or more servers 106 through a network 108 according to an example. The vowel pronunciation assessment engine 104 can be used for assessing the pronunciation and speaking proficiency of a speaker, such as a speaker speaking a non-native language, by measuring the speaker's ability to produce proper vowel sounds in that non-native language. Measuring speaking proficiency may be useful in a number of contexts, such as a testing context, where an examinee's speaking proficiency must be at a certain level to be considered for a job, admission to a school, citizenship, etc. Measuring speaking proficiency through vowel pronunciation assessment may also be useful in a teaching context. While many standard metrics for measuring speech proficiency are not intuitive (e.g., acoustic likelihood scores and phone confidence scores), critiquing of vowel sound pronunciation is intuitive to both student and teacher. Based on an assessment of vowel pronunciation, feedback can be given to a teacher or to a student as to vowel pronunciation errors that are found and suggestions for exercises or activities that may be implemented to improve vowel pronunciation.

The non-native vowel pronunciation assessment engine 104 may offer a significant degree of efficiency by obviating a need for human scorers to evaluate examinee speech samples. Thus, the non-native vowel pronunciation assessment engine 104 can be utilized for broader testing over much larger populations of examinees in a cost effective manner, where the engine 104 is provided examinee speech samples, such as via a recording, the engine 104 processes the sample, and the engine 104 provides a proficiency score. The automated non-native vowel pronunciation assessment engine 104 may also provide improved accuracy and consistency of scoring over human scorers.

With reference to FIG. 1, the engine 104 can be implemented using a processing system (e.g., one or more computer processors) executing software operations or routines for assessing non-native vowel pronunciation proficiency. User computers 102 can interact with the engine 104 through a number of ways, such as over one or more networks 108. One or more servers 106 accessible through the network(s) 108 can host the non-native vowel pronunciation assessment engine 104. It should be understood that the non-native vowel pronunciation assessment engine 104 could also be provided on a stand-alone computer for access by a user. The non-native vowel pronunciation assessment engine 104 generates an assessment score for non-native speech pronunciation by analyzing acoustic characteristics of vowel pronunciations in a speech sample. The one or more servers 106 are responsive to one or more data stores 110 for providing input data to the non-native vowel pronunciation assessment engine 104. The one or more data stores 110 may include determined vowel pronunciation metrics 112 and vowel pronunciation models 114.

Figure 2:
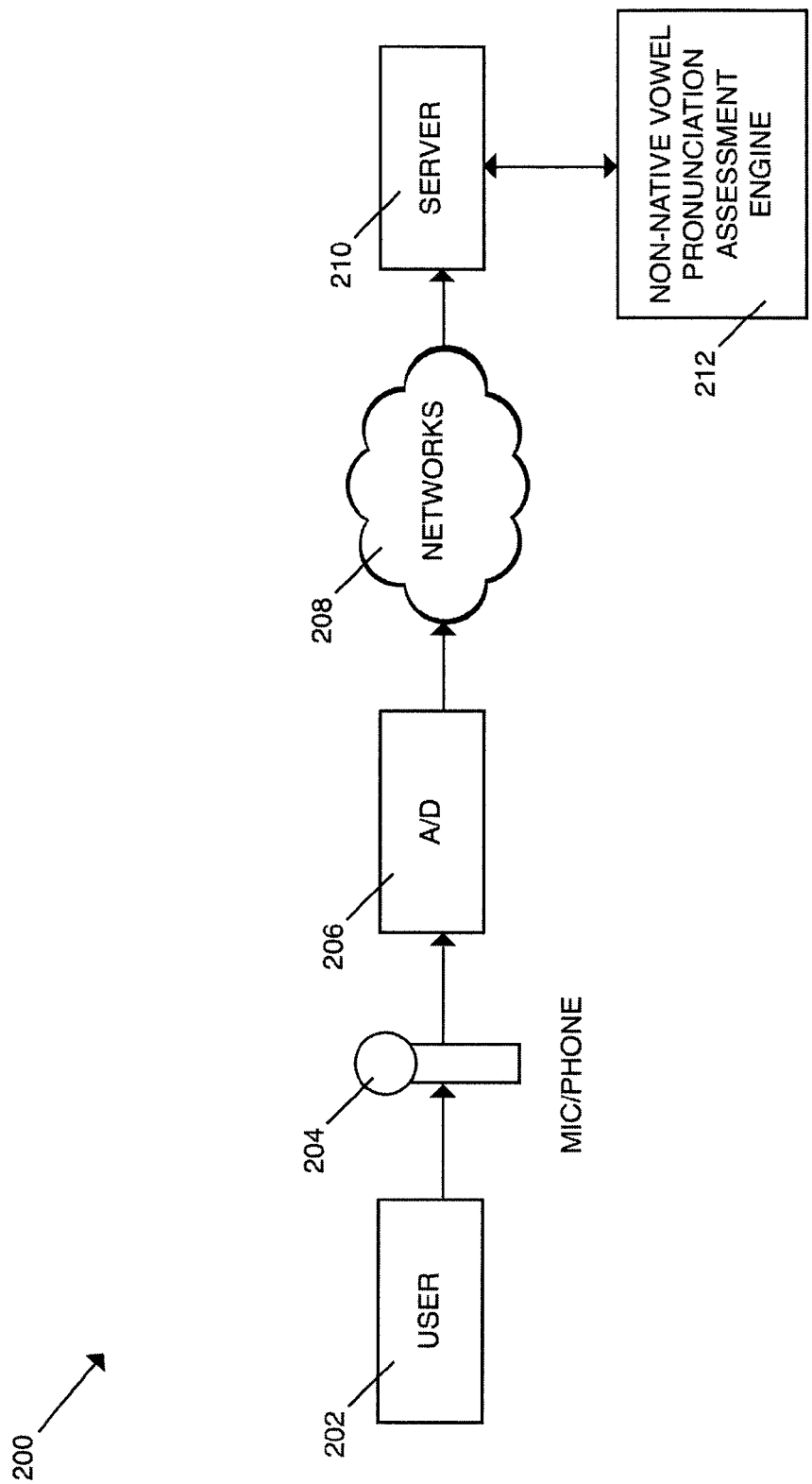
FIG. 2 is a block diagram depicting elements used for capturing speech from a person being evaluated.

FIG. 2 is a block diagram depicting elements used for capturing speech from a person being evaluated according to an example. A user 202 may be prompted to read a selection of text or speak spontaneously into a microphone, telephone, or other sound receiver 204. The signal produced by the user 202 speaking into the microphone 204 is provided to a computer 205 containing an analog to digital (A/D) converter 206 that converts the analog signal received from the microphone 204 into a digital representation of that signal. The digitized signal output from the A/D converter 206 may be stored in computer 205 or transmitted to other computer systems for storage. For example, the digitized signal may be transported via a network 208 for storage on a server 210. The recorded speech can then be analyzed with a non-native vowel pronunciation assessment engine 212.

Figure 3:
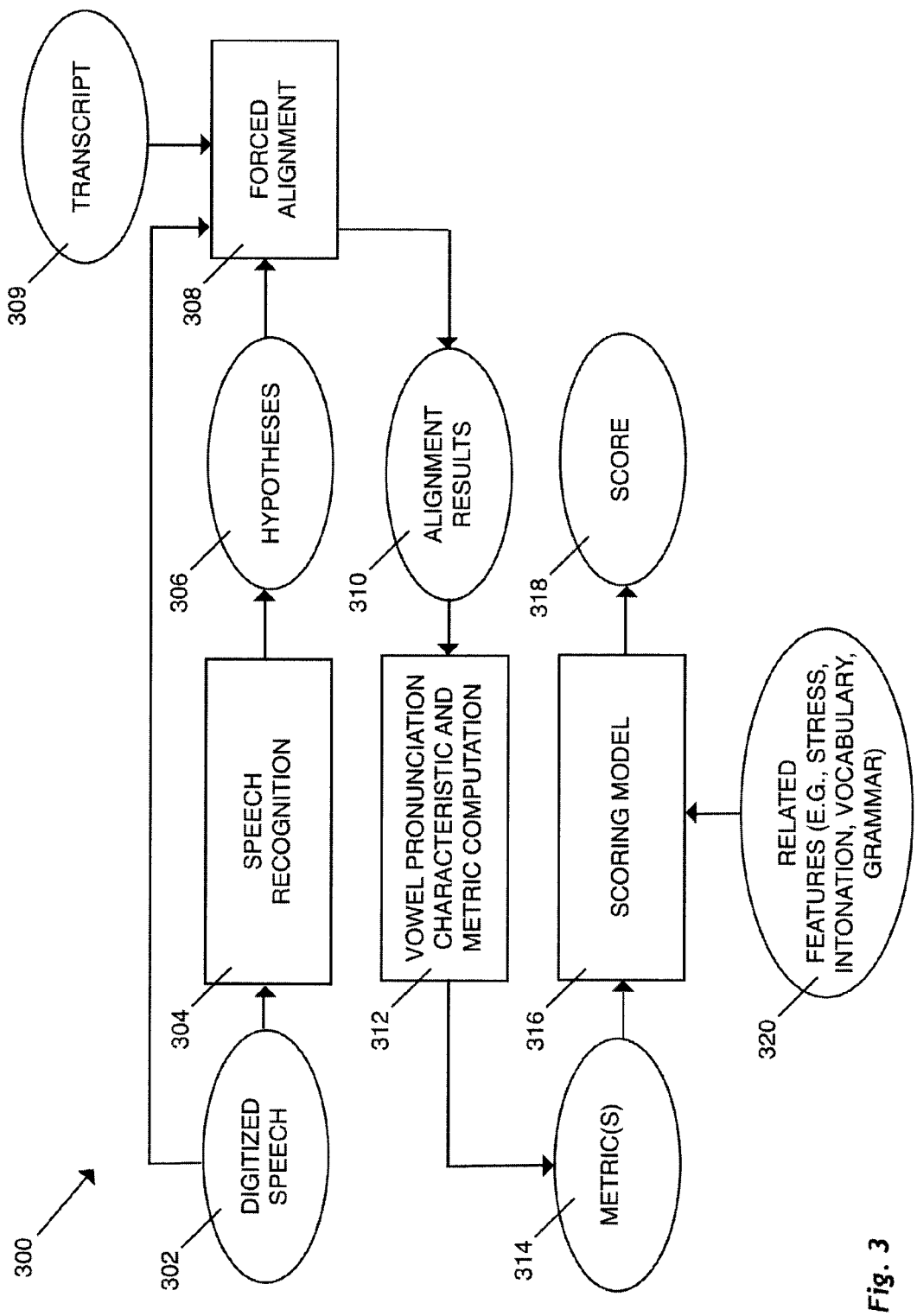
FIG. 3 is a flow diagram depicting a process for assessing speech vowel pronunciation of a non-native language speaker.

FIG. 3 is a functional block diagram depicting an exemplary process for assessing speech vowel pronunciation of a non-native language speaker. The functions represented can be implemented using any suitable processing system (e.g., one or more computer processors executing software routines written in any suitable programming language such as C, C++, Java, etc.). Digitized speech is received at 302 via an A/D converter. If the speech is spontaneous speech for which a transcript is not known, then the received digitized speech 302 is provided for speech recognition 304. The speech recognition 304 generates word hypotheses 306 of the words in the digitized speech. The word hypotheses are identifications of words that likely correspond to those of the digitized speech.

For spontaneous speech, the hypotheses 306 and the digitized speech 302 are provided for forced alignment 308, sometimes referred to as time alignment. If the speech is scripted speech, such as text read aloud by an examinee into a microphone, then a transcript 309 of the text used by the examinee and the digitized speech 302 are provided for forced alignment 308, and the speech recognition branch 302, 304, 306 may be omitted. If the speech is not scripted, then the speech can be first analyzed using any suitable speech recognition technique such as those conventionally known in the art to generate a script of the speech. The forced alignment 308 creates a time-alignment between the string of words identified in the word hypotheses 306 or transcript 309 and/or the phonemes (e.g., vowel sounds) contained therein with the digitized speech signal 302. This alignment may be performed, for instance, by using any suitable segmentation and alignment techniques such as those conventionally known in the art along with, for example, a Viterbi decoding process to find a most likely match between the transcript phonemes and audio of the digitized speech, such as conventionally known in the art. Such forced alignment may be provided using a number of applications known to those skilled in the art including using a Penn Phonetics Lab Forced Aligner (P2FA), for example. The alignment results 310 may be identified as a list of words or phonemes in the hypotheses 306 or transcript 309 along with their respective start and end times in the digitized speech signal 302.

After aligning words and phonemes with the digitized speech 302, measurements of characteristics of the digitized speech 302 may be extracted. For example, certain vowel pronunciation characteristics may be extracted at 312. Based on the forced alignment procedure 308, the non-native vowel pronunciation assessment engine can determine the boundaries of the vowel phonemes in the digitized speech by identifying the vowel sounds of interest in the transcript and the associated time periods of the digitized speech sample. Using those boundaries, the assessment engine can access the examinee's pronunciation of those phonemes for characteristic extraction. Raw vowel characteristics may be provided to metric formulas or subjected to other manipulation to identify a plurality of vowel pronunciation metrics 314 for the non-native speech sample, such as those described further below.

The vowel pronunciation metrics 314 are provided to a scoring model 316, which computes a score 318 for the digitized speech 302. For example, the scoring model 316 may be a regression model that applies a weight to each of the plurality of vowel pronunciation metrics to determine the score 318 for the digitized speech sample 302. The scoring model 316 may also consider other metrics 320 in addition to vowel pronunciation metrics 314 in determining a score for the digitized speech. For example, the other metrics 320 may include metrics related to speech stress, intonation, vocabulary, or grammar.

It has been observed that certain vowel sounds are not produced distinctly by non-native English speakers having a lower level of speaking proficiency. While native speakers tend to pronounce two "close" vowel sounds of a phonetically similar vowel pair distinctly (e.g., /i/ as in "cheese" versus /I/ as in "six"; /e/ as in "snake" versus /ɛ/ as in "chess"; /a/ as in "Bob" versus /ʌ/ as in "sun"; and /u/ as in "food" versus /ʊ/ as in "good"), non-native speakers having lower levels of speaking proficiency will tend to produce both vowel sounds of a similar vowel pair in the same way. Thus, a level of speaking proficiency can be implied by measuring the distinctiveness of vowel sound pronunciation of a similar vowel pair. Where both vowel sounds of a similar vowel pair are pronounced distinctly by a speaker, that speaker is judged to have a higher degree of proficiency for the vowel pronunciation metric over a speaker who pronounces both vowel sounds of a similar vowel pair in the same way.

Figure 4:
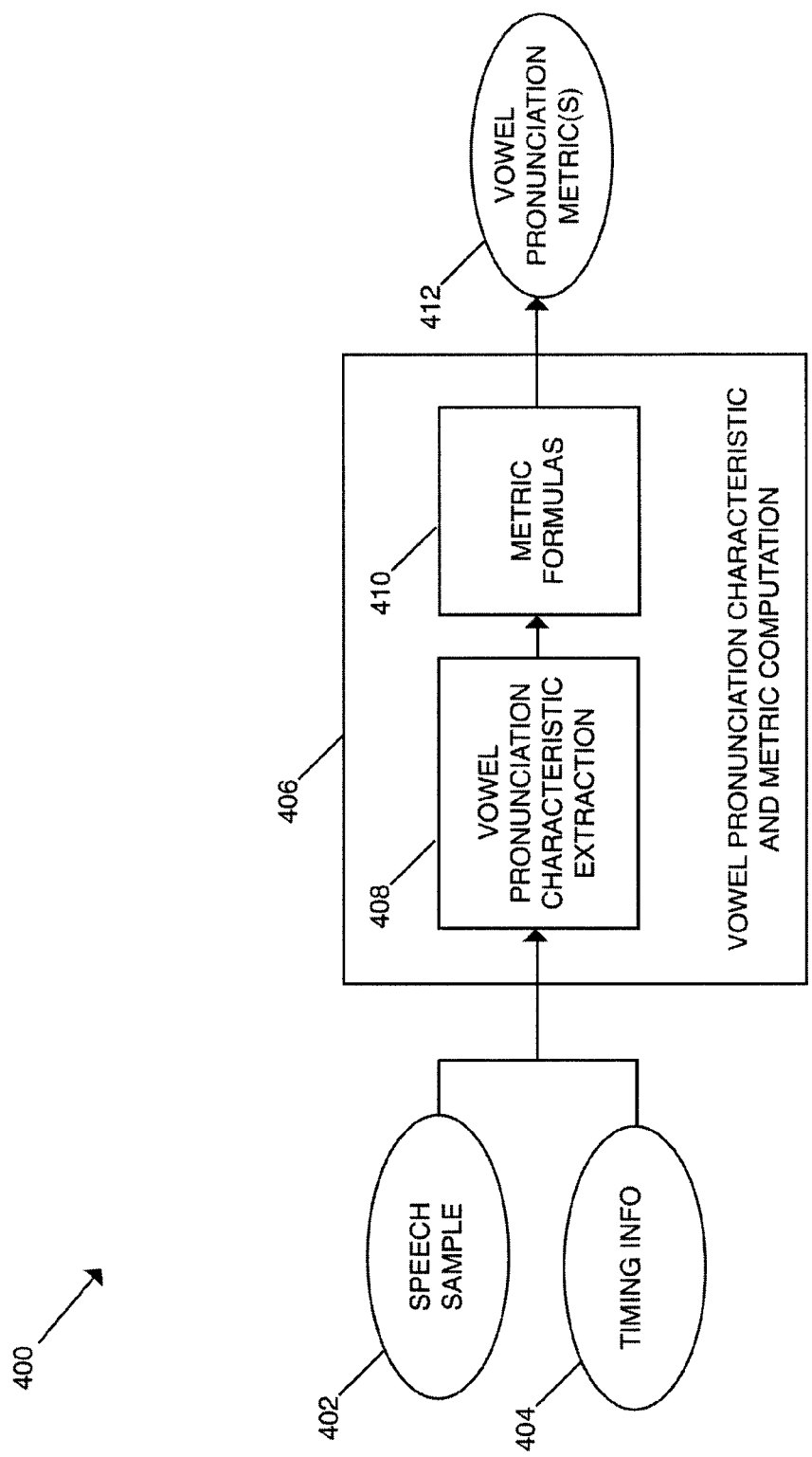
FIG. 4 is a block diagram depicting vowel pronunciation characteristic and metric computation.

FIG. 4 is a functional block diagram depicting exemplary vowel pronunciation characteristic and metric computation. Alignment results in the form of a speech sample 402 and timing information 404 are received as inputs for vowel pronunciation characteristic and metric computation 406. At 408, vowel pronunciation characteristic extraction is performed to identify characteristics of vowel pronunciations within the speech sample. For example, the timing information 404 identifies the location and boundaries of vowel pronunciations within the speech sample 402. The portions of the speech sample 402 within those boundaries are accessed and analyzed to extract the vowel pronunciation characteristics.

Example vowel pronunciation characteristics that may be extracted include vowel formant measurements. A vowel formant measurement is a measurement of an amplitude peak in a vowel spectrum that indicates a resonant frequency of a vowel. Vowel formant measurements are extractable characteristics that may be captured through analysis of the speech sample 402 and the timing information 404.

In one example, F1 and F2 measurements are extracted at a point one-third of the way into the duration of a vowel. In another example, only vowels bearing lexical stress as identified by a dictionary are included in the vowel characteristic extraction. In another example, all vowel tokens preceding the consonant 'R' are excluded from analysis due to a strong centralizing effect that the consonant 'R' has on preceding vowels. In a further example, vowel tokens for each speaker may be normalized to reduce effects of speaker-specific physiological characteristics using z-scores of all formant measurements.

Having extracted vowel characteristics, such as vowel formants F1 and F2, alone or in conjunction with other characteristics, the characteristics are provided to metric formulas 410 or other manipulations to generate vowel pronunciation metrics 412 for scoring. A number of different vowel pronunciation metrics 412 may be calculated using the metric formulas 410 for consideration by a scoring model.

For example, a vowel pronunciation metric may be calculated based on the difference in pronunciation of vowels in a similar vowel pair as measured by the F1 and F2 formant measurements for the pronunciation of those vowels. In one example, a distance measurement between two vowels in a similar vowel pair (e.g., /i/ versus /I/; /e/ versus /ɛ/; /a/ versus /Λ/; and /u/ versus /ʊ/) is determined using the mean F1 and F2 formant measurements of those vowel pronunciations in the speech sample according to the following:

$$\text{Dist}(v_i, v_j) = \sqrt{(\overline{F1}_{vi} - \overline{F1}_{vj})^2 + (\overline{F2}_{vi} - \overline{F2}_{vj})^2},$$

where $\overline{F1}_{vi}$ is a mean F1 measurement for a first vowel i of a similar vowel pair, $\overline{F1}_{vj}$ is a mean F1 measurement for a second vowel j of the similar vowel pair, $\overline{F2}_{vi}$ is a mean F2 measurement for vowel i, and $\overline{F2}_{vj}$ is a mean F2 measurement for vowel j.

The distance between vowel sounds of a similar vowel pair produced by a speaker indicates a level of speech proficiency. A speech proficiency metric is generated based on one or more of these distances alone or in combination with other speech proficiency metrics. Larger distance values indicate more distinction between vowels of similar vowel pairs and, thus, higher levels of speaking proficiency, while smaller distances are indicative of lower levels of speech proficiency.

Figure 5:
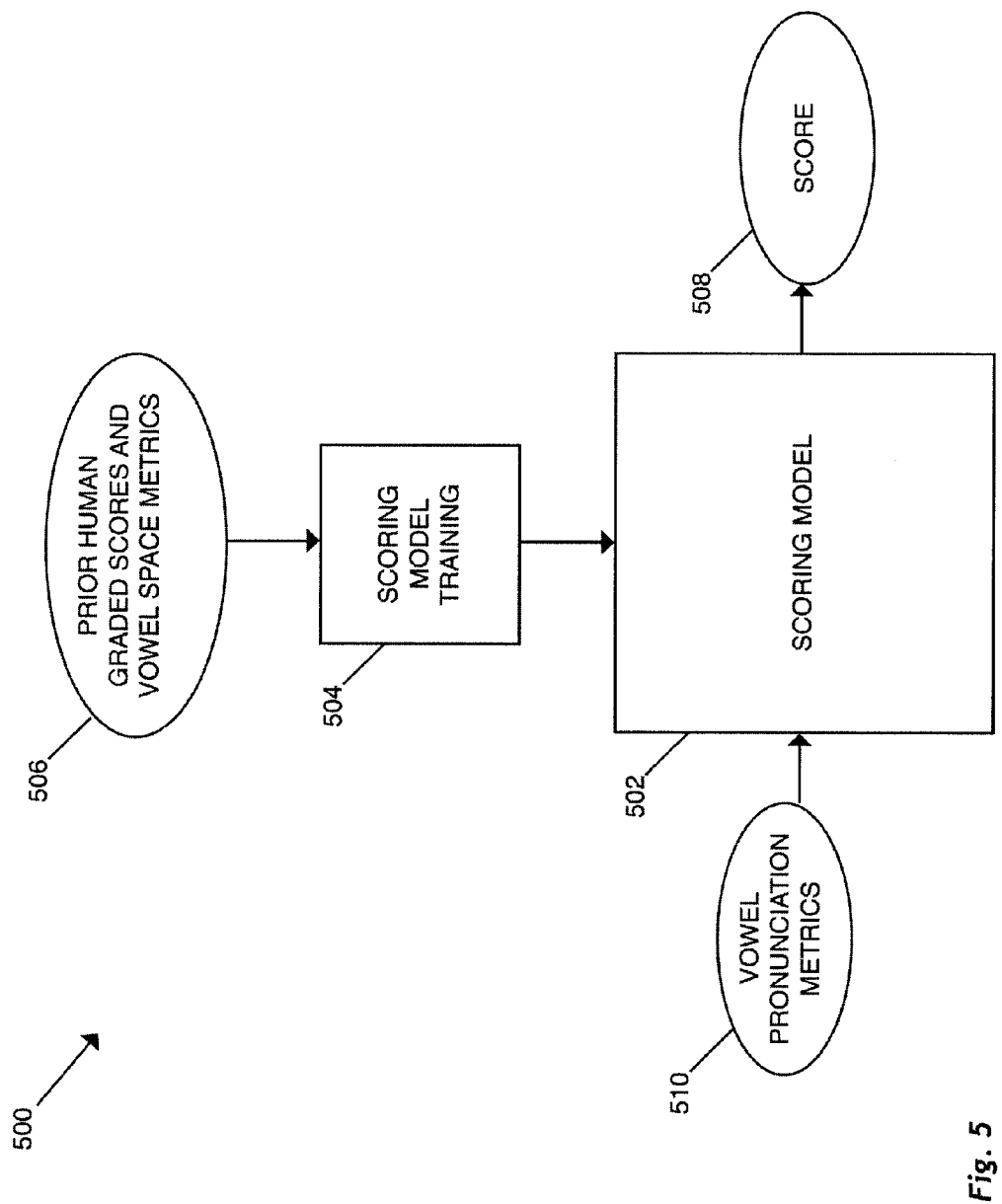
FIG. 5 is a block diagram depicting training of a scoring model and use of the scoring model to score a speech sample.

FIG. 5 is a functional block diagram depicting exemplary training of a scoring model and use of the scoring model to score a speech sample. A scoring model may utilize one or more vowel pronunciation metrics to generate a speech proficiency score. For example, a scoring model may use one, more, or all of the above described vowel pronunciation metrics and may further use one or more non-vowel pronunciation metrics in generating a score. A scoring model 502 may take a variety of forms, such as a regression model or neural network whose general properties and training are known in the art, but which is now applied to vowel pronunciation metrics. At 504, the scoring model is trained. For example, prior human scores of speech proficiency for speech samples may be received along with vowel pronunciation metrics 506. The vowel pronunciation metrics for a speech sample may be compared to a human given speech proficiency score for that speech sample to identify a correlation between the human score and the vowel pronunciation metric. That correlation may be used to set a parameter of the scoring model, such as a vowel pronunciation metric weight in a regression scoring model 502.

After the scoring model 502 has been trained, the scoring model 502 is ready to provide scores 608 for a speech sample. As discussed above, vowel pronunciation metrics 510 are identified based on vowel characteristics extracted from a speech sample. The vowel pronunciation metrics 510 are provided to the scoring model 502 and used to determine a speech proficiency score for a speech sample.

Figure 6:
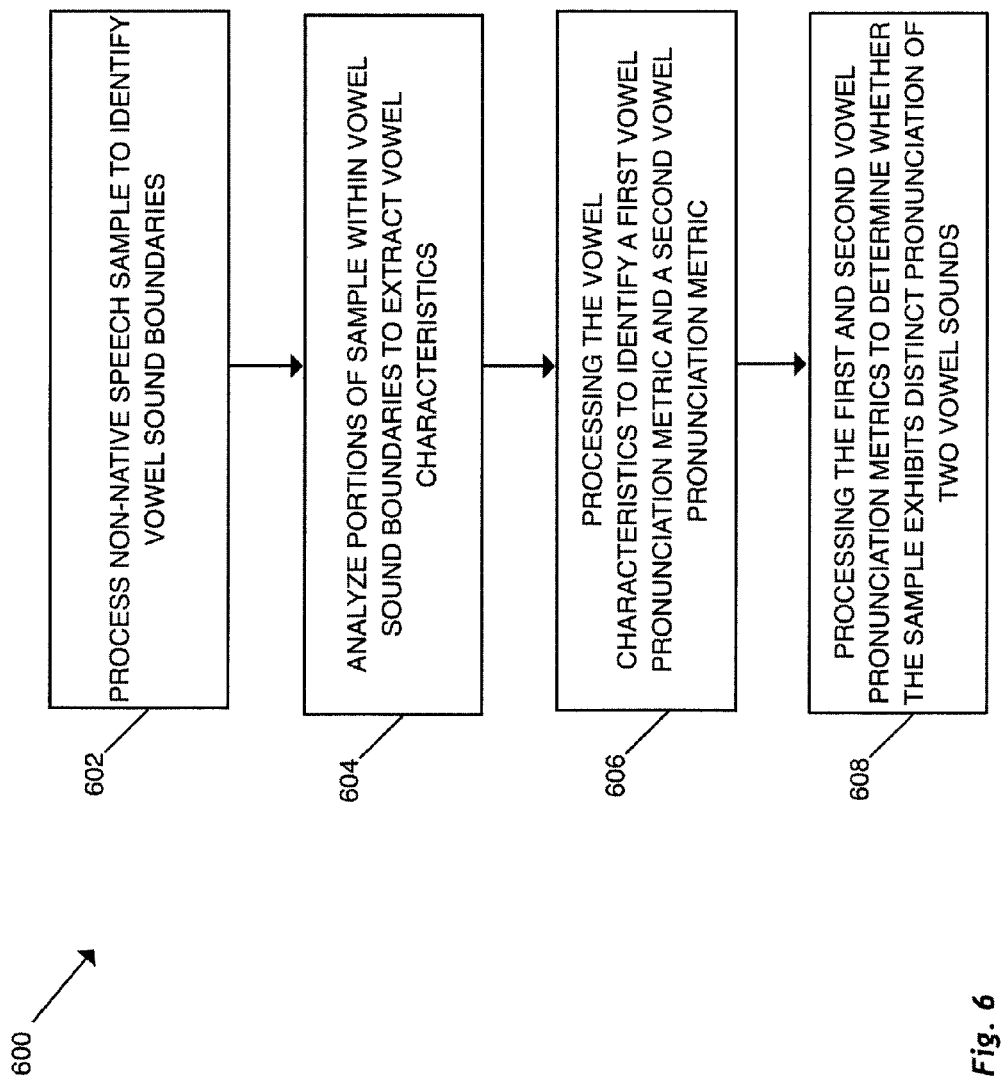
FIG. 6 is a flow diagram depicting a computer-implemented method of assessing non-native speech proficiency.

FIG. 6 is a flow diagram depicting an exemplary method of assessing non-native speech proficiency. At 602, a non-native speech sample is processed to identify a plurality of vowel sound boundaries in the non-native speech sample. At 604, Portions of the non-native speech sample are analyzed within the vowel sound boundaries to extract vowel characteristics associated with a first vowel sound and a second vowel sound represented in the non-native speech sample. The vowel characteristics are processed at 606 to identify a first vowel pronunciation metric for the first vowel sound and a second vowel pronunciation metric for the second vowel sound, and at 608, the first vowel pronunciation metric and the second vowel pronunciation metric are processed to determine whether the non-native speech sample exhibits a distinction in pronunciation of the first vowel sound and the second vowel sound.

Figure 7C:
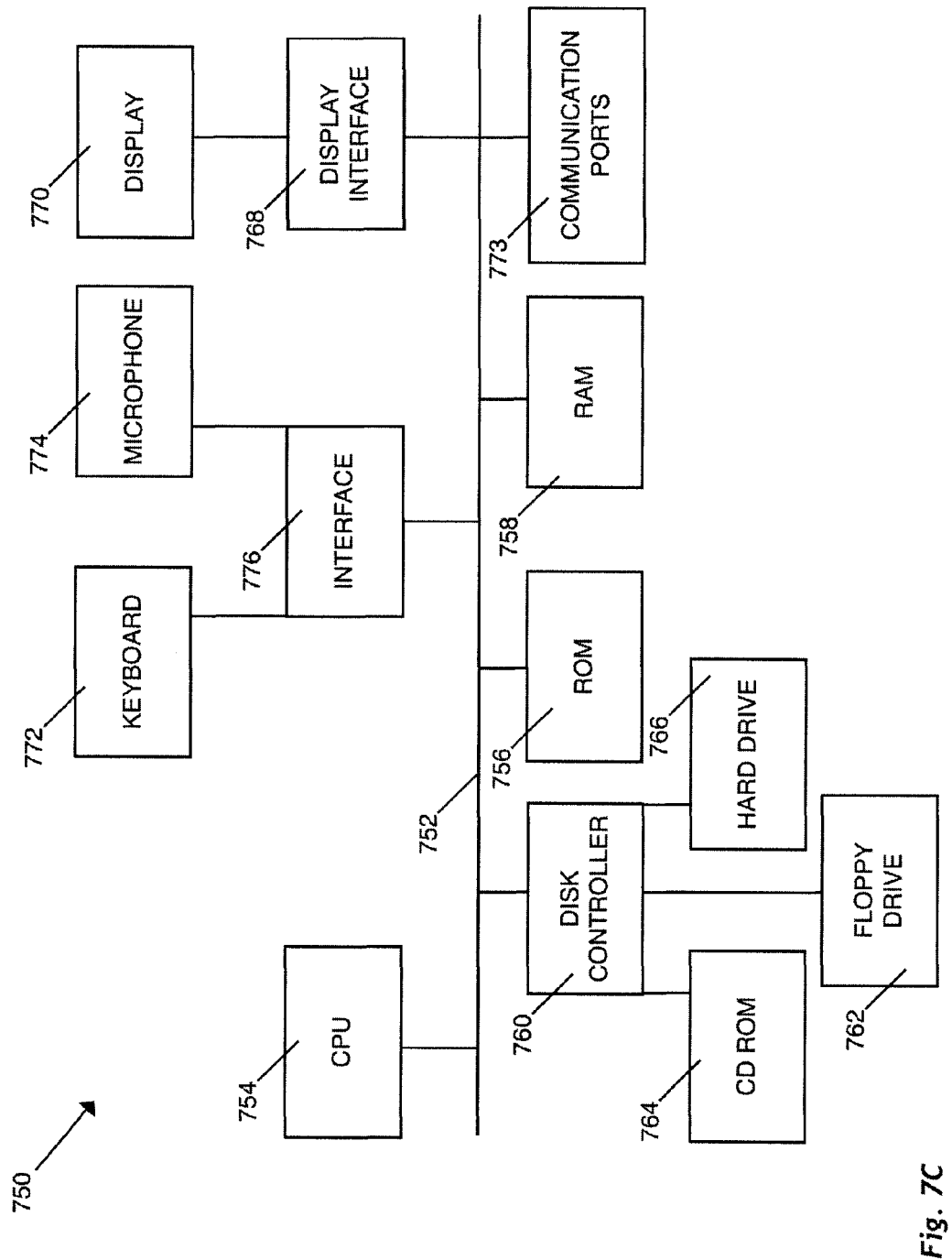

FIGS. 7A, 7B, and 7C depict example systems for use in implementing a non-native vowel pronunciation assessment engine. For example, FIG. 7A depicts an exemplary system 700 that includes a stand alone computer architecture where a processing system 702 (e.g., one or more computer processors) includes a non-native vowel pronunciation assessment engine 704 being executed on it. The processing system 702 has access to a computer-readable memory 706 in addition to one or more data stores 708. The one or more data stores 708 may contain vowel pronunciation metrics 710 as well as a vowel pronunciation scoring model 712.

FIG. 7B depicts a system 720 that includes a client server architecture. One or more user PCs 722 accesses one or more servers 724 running a non-native vowel pronunciation assessment engine 726 on a processing system 727 via one or more networks 728. The one or more servers 724 may access a computer readable memory 730 as well as one or more data stores 732. The one or more data stores 732 may contain vowel pronunciation metrics 734 as well as a vowel pronunciation scoring model 736.

FIG. 7C shows a block diagram of exemplary hardware for a standalone computer architecture 750, such as the architecture depicted in FIG. 7A, that may be used to contain and/or implement the program instructions of exemplary embodiments. A bus 752 may serve as the information highway interconnecting the other illustrated components of the hardware. A processing system 754 labeled CPU (central processing unit) (e.g., one or more computer processors), may perform calculations and logic operations required to execute a program. A computer-readable storage medium, such as read only memory (ROM) 756 and random access memory (RAM) 758, may be in communication with the processing unit 754 and may contain one or more programming instructions for performing the method of implementing a non-native vowel pronunciation assessment engine. Optionally, program instructions may be stored on a non-transitory computer readable storage medium such as a magnetic disk, optical disk, recordable memory device, flash memory, RAM, ROM, or other physical storage medium. Computer instructions may also be communicated via a communications signal, or a modulated carrier wave and then stored on a non-transitory computer-readable storage medium.

A disk controller 760 interfaces one or more optional disk drives to the system bus 752. These disk drives may be external or internal floppy disk drives such as 762, external or internal CD-ROM, CD-R, CD-RW or DVD drives such as 764, or external or internal hard drives 766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. Preferably, the processor 754 may access each component as required.

A display interface 768 may permit information from the bus 752 to be displayed on a display 770 in audio, graphic, or alphanumeric format. Communication with external devices may optionally occur using various communication ports 773.

In addition to the standard computer-type components, the hardware may also include data input devices, such as a keyboard 772, or other input device 774, such as a microphone, remote control, pointer, mouse and/or joystick.

The invention has been described with reference to particular exemplary embodiments. However, it will be readily apparent to those skilled in the art that it is possible to embody the invention in specific forms other than those of the exemplary embodiments described above. For example, a non-native vowel pronunciation speech assessment engine may be configured for use in scoring an examinee's ability to speak a native language in addition to non-native proficiency testing. The embodiments are merely illustrative and should not be considered restrictive. The scope of the invention is reflected in the claims, rather than the preceding description, and all variations and equivalents which fall within the range of the claims are intended to be embraced therein.

It is claimed:

1. A computer-implemented method of assessing non-native speech proficiency, comprising:
   receiving, using a sound receiving device, a non-native speech sample uttered by a user;
   generating, using a processing system, word hypotheses for the non-native speech sample uttered by a user, the word hypotheses being generated by an automatic speech recognition software;
   generating, using the processing system, time alignments between the word hypotheses and corresponding sounds of the non-native speech sample, the time alignments being generated by a time alignment software;
   identifying, using the processing system, a plurality of vowel sound boundaries in the non-native speech sample using the word hypotheses and the time alignments;
   analyzing, using the processing system, portions of the non-native speech sample within the vowel sound boundaries to extract first vowel characteristics associated with a first vowel sound and second vowel characteristics associated with a second vowel sound represented in the non-native speech sample, wherein the first vowel sound and the second vowel sound form a set of phonetically similar vowel sounds, and wherein the first vowel sound and the second vowel sound are uttered by the user;
   computing, using the processing system, a distance measurement using the first vowel characteristics and the second vowel characteristics, the distance measurement representing a difference between the first vowel characteristics and the second vowel characteristics, to determine whether the non-native speech sample exhibits a distinction in pronunciation of the first vowel sound and the second vowel sound;
   generating, using the processing system, an assessment of speech proficiency based on the distance measurement; and
   outputting the assessment of speech proficiency through a display interface.

2. The method of claim 1, wherein a proficient native speaker pronounces the first vowel sound distinctly from the second vowel sound, and wherein a non-proficient non-native speaker pronounces the first vowel sound and the second vowel sound substantially identically.

3. The method of claim 1, wherein the set of phonetically similar vowel sounds includes one or more of: /i/ versus /I/; /e/ versus /ɛ/; /a/ versus /ʌ/; and /u/ versus /ʊ/.

4. The method of claim 1, wherein the set of phonetically similar vowel sounds includes one or more of: /i/ as in "cheese" versus /I/ as in "six"; /e/ as in "snake" versus /ɛ/ as in "chess"; /a/ as in "Bob" versus /ʌ/ as in "sun"; and /u/ as in "food" versus /ʊ/ as in "good".

5. The method of claim 1, further comprising:
   outputting, through the display interface, feedback that offers vowel pronunciation suggestions for improving communicative competence through better vowel pronunciation.

6. The method of claim 1, wherein the first vowel characteristics and the second vowel characteristics comprise vowel formant measurements.

7. The method of claim 6, wherein a vowel formant measurement comprises a measurement of an amplitude peak in a vowel spectrum that indicates a resonant frequency of a vowel.

8. The method of claim 1, wherein the first vowel characteristics comprise an F1 measurement and an F2 measurement of the first vowel sound, and wherein the second vowel characteristics comprise an F1 measurement and an F2 measurement of the second vowel sound.

9. The method of claim 8, wherein the distance measurement is based on a calculation of:

$$\text{Dist}(v_i, v_j) = \sqrt{(\overline{F1}_{vi} - \overline{F1}_{vj})^2 + (\overline{F2}_{vi} - \overline{F2}_{vj})^2},$$

wherein $\overline{F1}_{vi}$ is a mean F1 measurement for vowel sound i, wherein $\overline{F1}_{vj}$ is a mean F1 measurement for vowel sound j, wherein $\overline{F2}_{vi}$ is a mean F2 measurement for vowel sound i, wherein $\overline{F2}_{vj}$ is a mean F2 measurement for vowel sound j.

10. The method of claim 1, wherein generating the assessment is further based on a stress metric, an intonation metric, a vocabulary metric, or a grammar metric.

11. The method of claim 1, further comprising:
    wherein the assessment is determined using a scoring model.

12. A computer-implemented system for assessing non-native speech proficiency, comprising:
    one or more data processors;
    one or more computer-readable storage mediums encoded with instructions for commanding the one or more data processors to execute steps that include:
       obtaining a non-native speech sample uttered by a user received through a sound receiving device;
       generating word hypotheses for a non-native speech sample uttered by a user, the word hypotheses being generated by automatic speech recognition software instructions;
       generating time alignments between the word hypotheses and corresponding sounds of the non-native speech sample, the time alignments being generated by a time alignment software;
       identifying a plurality of vowel sound boundaries in the non-native speech sample using the word hypotheses and the time alignments;
       analyzing portions of the non-native speech sample within the vowel sound boundaries to extract first vowel characteristics associated with a first vowel sound and second vowel characteristics associated with a second vowel sound represented in the non-native speech sample, wherein the first vowel sound and the second vowel sound form a set of phonetically similar vowel sounds, and wherein the first vowel sound and the second vowel sound are uttered by the user;

computing, a distance measurement using the first vowel characteristics and the second vowel characteristics, the distance measurement representing a difference between the first vowel characteristics and the second vowel characteristics, to determine whether the non-native speech sample exhibits a distinction in pronunciation of the first vowel sound and the second vowel sound;

generating, using the processing system, an assessment of speech proficiency based on the distance measurement; and outputting the assessment of speech proficiency through a display interface.

13. The system of claim 12, wherein a proficient native speaker pronounces the first vowel sound distinctly from the second vowel sound, and wherein a non-proficient non-native speaker pronounces the first vowel sound and the second vowel sound substantially identically.

14. The system of claim 12, wherein the set of phonetically similar vowel sounds includes one or more of: /i/ versus /I/; /e/ versus /ɛ/; /a/ versus /ʌ/; and /u/ versus /ʊ/.

15. A non-transitory computer-readable storage medium comprising instructions for which when executed cause a processing system to execute steps comprising:

obtaining a non-native speech sample uttered by a user received through a sound receiving device;

generating word hypotheses for a non-native speech sample uttered by a user, the word hypotheses being generated by automatic speech recognition software;

generating time alignments between the word hypotheses and corresponding sounds of the non-native speech sample, the time alignments being generated by a time alignment software;

identifying a plurality of vowel sound boundaries in the non-native speech sample using the word hypotheses and the time alignments;

analyzing portions of the non-native speech sample within the vowel sound boundaries to extract first vowel characteristics associated with a first vowel sound and second vowel characteristics associated with a second vowel sound represented in the non-native speech sample, wherein the first vowel sound and the second vowel sound form a set of phonetically similar vowel sounds, and wherein the first vowel sound and the second vowel sound are uttered by the user;

computing a distance measurement using the first vowel characteristics and the second vowel characteristics, the distance measurement representing a difference between the first vowel characteristics and the second vowel characteristics, to determine whether the non-native speech sample exhibits a distinction in pronunciation of the first vowel sound and the second vowel sound;

generating, using the processing system, an assessment of speech proficiency based on the distance measurement; and outputting the assessment of speech proficiency through a display interface.

* * * * *